United States Patent
Schütz et al.

(10) Patent No.: US 11,318,853 B2
(45) Date of Patent: May 3, 2022

(54) AUTOMATED CONNECTION OF A CHARGING PLUG TO A CHARGING INTERFACE OF A VEHICLE

(71) Applicants: Volkswagen Aktiengesellschaft, Wolfsburg (DE); KUKA Deutschland GmbH, Augsburg (DE)

(72) Inventors: Daniel Schütz, Lehre (DE); Norbert Settele, Willprechtszell (DE)

(73) Assignees: VOLKSWAGEN AKTIENGESELLSCHAFT, Wolfsburg (DE); KUKA DEUTSCHLAND GMBH, Augsberg (DE)

( * ) Notice: Subject to any disclaimer, the term of this patent is extended or adjusted under 35 U.S.C. 154(b) by 27 days.

(21) Appl. No.: 16/922,687

(22) Filed: Jul. 7, 2020

(65) Prior Publication Data

US 2021/0008991 A1 Jan. 14, 2021

(30) Foreign Application Priority Data

Jul. 8, 2019 (DE) ...................... 10 2019 210 042.2

(51) Int. Cl.
*B60L 53/16* (2019.01)
*B60L 53/37* (2019.01)

(52) U.S. Cl.
CPC .............. *B60L 53/16* (2019.02); *B60L 53/37* (2019.02)

(58) Field of Classification Search
CPC .................................. B60L 53/16; B60L 53/37
USPC ......................................................... 320/109
See application file for complete search history.

(56) References Cited

U.S. PATENT DOCUMENTS

| | | | | |
|---|---|---|---|---|
| 10,518,658 | B1 * | 12/2019 | Eakins | ................ H01R 13/447 |
| 10,696,167 | B2 | 6/2020 | Wetzel et al. | |
| 2009/0079388 | A1 * | 3/2009 | Reddy | .................. B60L 53/305 |
| | | | | 320/109 |

(Continued)

FOREIGN PATENT DOCUMENTS

| | | | | |
|---|---|---|---|---|
| CN | 104241948 A | 12/2014 | ............. B60L 11/18 |
| CN | 108146283 A | 6/2018 | ............. B06L 11/18 |

(Continued)

OTHER PUBLICATIONS

Chinese Office Action, Application No. 202010651478.6, 8 pages.

*Primary Examiner* — Suresh Memula
(74) *Attorney, Agent, or Firm* — Slayden Grubert Beard PLLC

(57) ABSTRACT

The invention relates to an arrangement for connecting a charging plug to a charging interface of a vehicle, with a moving apparatus with a plurality of controllable movement axes; a tool which can be positioned by means of the moving apparatus relative to the vehicle and is configured to hold the charging plug, the tool having a centering device for centering the charging plug within the tool and a controllable tool movement axis for moving the charging plug independently of the movement axes of the moving apparatus; wherein the tool with the charging plug centered therein can be positioned in a predetermined relative position with regard to the charging interface by means of the moving apparatus and the charging plug can subsequently be connected with the charging interface by using the tool movement axis.

15 Claims, 2 Drawing Sheets

(56) References Cited

U.S. PATENT DOCUMENTS

| | | | | |
|---|---|---|---|---|
| 2011/0254504 A1* | 10/2011 | Haddad | ................... | B60L 53/65 |
| | | | | 320/109 |
| 2013/0076902 A1* | 3/2013 | Gao | ................... | H01R 13/6683 |
| | | | | 348/148 |
| 2014/0067660 A1* | 3/2014 | Cornish | ............... | G06Q 20/145 |
| | | | | 705/39 |
| 2014/0354229 A1* | 12/2014 | Zhao | ....................... | B60L 53/68 |
| | | | | 320/109 |
| 2017/0008411 A1* | 1/2017 | Wu | ........................ | B60L 53/305 |
| 2017/0008412 A1* | 1/2017 | Wu | ........................ | B60L 53/35 |
| 2017/0225578 A1* | 8/2017 | Paryani | ................... | B60L 53/11 |
| 2017/0225581 A1* | 8/2017 | Chai | ........................ | B60L 53/16 |
| 2018/0154785 A1 | 6/2018 | Wetzel | ................... | B60L 11/18 |
| 2020/0031248 A1* | 1/2020 | Kwak | ................... | H02J 7/0042 |
| 2020/0144831 A1* | 5/2020 | Choi | ........................ | B60L 53/16 |
| 2020/0353833 A1 | 11/2020 | Kim | ........................ | B60L 53/37 |
| 2020/0361331 A1* | 11/2020 | Shin | ........................ | B60L 53/37 |

FOREIGN PATENT DOCUMENTS

| | | | | |
|---|---|---|---|---|
| CN | 108879229 A | 11/2018 | ........... | H01R 13/502 |
| DE | 10 2012 216 980 | 4/2013 | ................ | B60S 5/00 |
| DE | 102012216980 A1 | 4/2013 | .............. | B60L 11/18 |
| DE | 10 2015 213 161 | 1/2017 | ................ | B60S 5/00 |
| DE | 102015213161 A1 | 1/2017 | ................ | B60S 5/00 |
| DE | 10 2016 123 188 | 6/2018 | ................ | B60S 5/00 |
| DE | 102016014463 A1 | 6/2018 | .............. | B25J 13/08 |
| DE | 102016123188 A1 | 6/2018 | ................ | B60S 5/00 |
| DE | 10 2018 111 008 | 6/2019 | .............. | B25J 13/08 |
| EP | 3 626 411 | 3/2020 | .............. | B25J 13/08 |
| EP | 2668062 | 11/2020 | ................ | B60L 3/00 |
| KR | 10 1 860 797 | 5/2018 | .............. | B60L 11/18 |
| WO | WO-2014015991 A2 * | 1/2014 | .............. | B60L 53/35 |
| WO | 2018 212167 | 11/2018 | .............. | B25J 13/08 |

* cited by examiner

AUTOMATED CONNECTION OF A CHARGING PLUG TO A CHARGING INTERFACE OF A VEHICLE

CROSS-REFERENCE TO RELATED APPLICATIONS

This application claims priority to German Patent Application No. DE 10 2019 210 042.2, filed on Jul. 8, 2019 with the German Patent and Trademark Office. The contents of the aforesaid patent application are incorporated herein for all purposes.

TECHNICAL FIELD

The invention relates to an arrangement for connecting a charging plug to a charging interface of a vehicle, a tool for such an arrangement and a method for connecting a charging plug to a charging interface of a vehicle. In general, the invention relates to the field of automated assembly, in particular automated assembly carried out with an industrial robot, wherein the assembly relates to connecting of a charging plug and a charging interface and in particular to plugging a charging plug and a charging interface.

BACKGROUND

This background section is provided for the purpose of generally describing the context of the disclosure. Work of the presently named inventor(s), to the extent the work is described in this background section, as well as aspects of the description that may not otherwise qualify as prior art at the time of filing, are neither expressly nor impliedly admitted as prior art against the present disclosure.

Vehicles comprising electrical energy storage devices are state of the art, wherein in the context of the solution disclosed herein such vehicles for example may be motor vehicles and in particular passenger cars or trucks. These can be purely electrically powered vehicles or so-called hybrid vehicles that are only partially electrically powered. To supply the energy storage devices with electrical energy, the vehicles must be connected to electrical charging devices. Such devices typically are charging stations or charging columns comprising a charging plug. The latter can be connected to a charging interface (for example comprising a socket) of the vehicle. In principle, however, it would also be conceivable to design the charging plug in the form of a socket, which then receives for example projecting plug contacts of the vehicle charging interface.

It is desirable in various circumstances to automatically connect the charging plug to a charging interface of the vehicle. In particular, robots and/or generally controllable moving apparatuses may be used for this.

Some approaches are characterized in particular by the fact that they require complex sensors to correctly insert the charging plug into the charging interface (for example, to determine the position of the charging interface and/or for force control). Likewise, by providing a large number of movement axes in addition to any robot axes, costs and complexity may be increased.

There is therefore a need to improve automated connecting of charging plugs to charging interfaces of a vehicle.

SUMMARY

The need is addressed by an arrangement, a tool, and a method according to the independent claims. Embodiments of the invention are discussed in the dependent claims and the following description. Of course, all of the aforementioned remarks and features may also be provided or apply to the present invention in some embodiments, unless otherwise stated or evident.

According to a first exemplary aspect, an arrangement for connecting a charging plug to a charging interface of a vehicle is provided with:

a moving apparatus with a plurality of controllable movement axes;

a tool which can be positioned using the moving apparatus relative to the vehicle and is configured to hold the charging plug, the tool having a centering device for centering the charging plug within the tool and a controllable tool movement axis for moving the charging plug independently of the movement axes of the moving apparatus;

wherein the tool with the charging plug centered therein can be positioned in a predetermined relative position with regard to the charging interface using the moving apparatus and wherein the charging plug subsequently can be connected with the charging interface using the tool movement axis.

The details of one or more embodiments are set forth in the accompanying drawings and the description below. Other features will be apparent from the description, drawings, and from the claims.

DESCRIPTION

Figure 1:
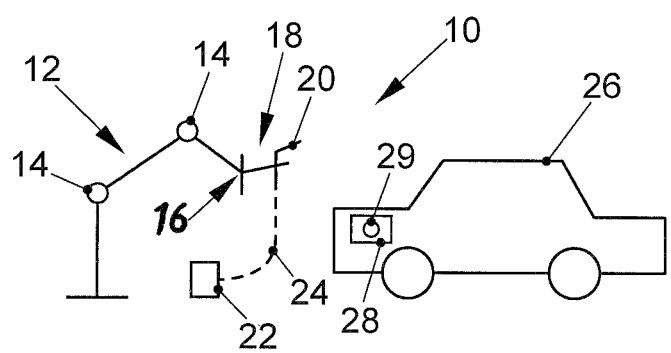
FIG. 1 shows a highly simplified schematic illustration of an arrangement in accordance with an embodiment.

In the following description of embodiments of the invention, specific details are described in order to provide a thorough understanding of the invention. However, it will be apparent to one of ordinary skill in the art that the invention may be practiced without these specific details. In other instances, well-known features have not been described in detail to avoid unnecessarily complicating the instant description.

A basic idea of the teachings herein is to subdivide the connecting process for connecting charging plugs and charging interfaces into different tasks and to accomplish them with components that are different and/or that build on one another. For example, the charging plug may be centered in a tool that is guided by means of a moving apparatus such as an industrial robot. This may comprise aligning the charging plug with a desired position and orientation in the tool. On the other hand, the tool itself may be arranged fixedly on the moving apparatus. For example, it may be attached to the moving apparatus with a known orientation. By this centering, a position of the charging plug can thus be assumed to be known and constant, for example in a coordinate system of the moving apparatus or generally relative to the tool and/or the moving apparatus. By controlling the movement axes of the moving apparatus, the position and/or orientation of the charging plug can thus be set in a targeted manner.

Furthermore, the centering also may enable the charging plug to be suitably aligned relative to a movement axis in the tool. The charging plug can then be displaced by means of the movement axis in a manner which is likewise known and which is the same for each charging plug. Consequently, the charging plug may be moved by means of the movement axis in a generally defined manner. In particular, the charging plug can be moved linearly and/or be displaced translationally by means of the movement axis, for example in the direction of the charging interface.

Therefore, according to the teachings herein, the charging plug may be positioned by means of the moving apparatus in a predetermined relative position with regard to the charging interface. For this purpose, the charging interface and in particular a location thereof can be sensed, for which, however, simple sensors and/or a general rough detection of the location are sufficient. For example, the arrangement for this purpose may comprise at least one camera sensor. The position of the charging interface can then be determined, for example, by means of pattern recognition or general image evaluation algorithms (for example by at least one control device of the arrangement).

The positioning by means of the moving apparatus for example may be carried out such that only a uniaxial movement by means of the movement axis of the tool is required in order to completely connect the charging plug to the charging interface. In the context of this disclosure, the charging plug and the charging interface can be referred to as connected when they have reached a predetermined engagement state and in particular are connected to one another in an electrically conductive manner. The predetermined state of engagement can be characterized by completely sliding one into the other and/or reaching at least one stop, for example when the charging plug is inserted into the charging interface.

The solution of the present teachings offers several benefits. On the one hand, the centering of the charging plug within the tool ensures that if the tool has been positioned relative to the charging interface, it can also be assumed and/or determined with sufficient accuracy that the tool has been aligned relative to the vehicle as desired. Centering also ensures that the charging plug can be displaced by means of the movement axis in a predetermined and defined manner. As a result, force controls that previously were necessary for tolerance compensation due to the unknown position of the charging plug within the tool can be eliminated or at least be less precise.

Further, the tool may comprise only one single movement axis in some embodiments, however, in principle several movement axes may be provided in other embodiments. In summary, in particular by providing the centering option, the charging plug can be inserted reliably and automatically into the charging interface with little or at least little precise effort of measurement as well as movements which are not complex to generate in some embodiments.

In detail and according to a first exemplary aspect, an arrangement for connecting a charging plug to a charging interface of a vehicle is proposed, comprising:
 a moving apparatus with several controllable movement axes;
 a tool that can be positioned by means of the moving apparatus relative to the vehicle and that is configured to hold the charging plug, wherein the tool comprises a centering device for centering the charging plug within the tool and a controllable tool movement axis for moving the charging plug independently of the movement axes of the moving apparatus;
 wherein the tool together with the charging plug centered therein can be positioned by means of the moving apparatus in a predetermined relative position with regard to the charging interface and wherein by means of the tool movement axis the charging plug subsequently can be connected (e.g. by moving) to the charging interface or can be plugged into the charging interface.

The moving apparatus in some embodiments may be an industrial robot, for example an articulated robot. In some embodiments, it may comprise six movement axes in the form of lined up axes of rotation. In general, the movement axes may for example define kinematics of the moving apparatus. The movement axes may be linear axes or rotational axes, each of which may include its own drives (for example, electric servomotors). Different types of movement axes may also be combined with one another within one moving apparatus, for example there may be provided combinations of linear and rotation axes.

By activating the movement axes, these may execute defined movements and/or take defined positions in a manner known per se. The tool may, for example, be connected to the moving apparatus at a tool interface in some embodiments. In general, the moving apparatus and, e.g., its movement axes may define an open kinematic chain, at the end of which the tool may be positioned.

In some embodiments, the moving apparatus may arrange the tool with any orientation and in any position relative to the vehicle, that is to say move the tool around all spatial axes and along all spatial axes. However, this is not mandatory. Movement around or along a smaller number of spatial axes is also possible in some embodiments.

The tool may be stationary relative to the moving apparatus and/or its tool interface and may be attached to the moving apparatus with a defined orientation, for example. Depending on the position of the movement axes, however, the tool may take different positions and/or locations in a basic coordinate system of the moving apparatus.

The charging plug may be held by the tool by means of a holding section in some embodiments. This holding section may be a gripping section, which may grip around a predetermined section of the charging plug, for example by moving gripping elements (for example gripping jaws and/or gripping fingers). Alternatively, the holding section may be designed without movable gripping elements (in particular generally rigid) and may be pushed onto a suitable section of the charging plug, for example. In this case, the holding section may be provided with a cylindrical recess.

In some embodiments, the holding section may be resiliently mounted within the tool and, for example, be resiliently coupled to the movement axis. As long as the charging plug interacts with the centering device, also the holding section may be centered in the tool. In other words, the holding section may for example be connected indirectly to the centering device via the charging plug and may thus be positioned centered within the tool. In this state, any resilient bearing cannot be of influence.

If, however, the charging plug no longer interacts with the centering device, for example because it is no longer engaged with the centering device, the charging plug may be connected to the tool solely via the handle and the resilient bearing. A tolerance compensation is provided via the resilient bearing when the charging plug is moved further along the tool movement axis. However, as will be explained in more detail below, this only may be of effect when the charging plug is already in contact with a guide section of the charging interface and is thus at least partially guided during a movement by means of the tool movement axis.

According to some embodiments, the resilient bearing is coupled to a spindle nut which may be displaced linearly along a spindle. This spindle nut/spindle combination may be encompassed by the tool movement axis and translate a rotational movement of the spindle into a linear movement of the spindle nut in a manner known per se.

The tool movement axis may in turn be a controllable movement axis in some embodiments. For example, it may be an electrically, hydraulically or pneumatically driven movement axis according to some embodiments. The movement axis for example may be a linear axis (that is to say an axis which generates a linear movement of elements coupled to it). In the case of a linear axis, however, the tool movement axis may also comprise components which are movable in a known manner and which perform rotational movements (for example the spindle mentioned above). Generally, in addition to the spindle nut/spindle combination already mentioned, the tool movement axis may in some embodiments alternatively also comprise cams, articulated connections, swivel connections or the like and/or at least one electric motor for generating the movement forces.

The centering device may be stationary positioned within the tool and may accommodate a predetermined area of the charging plug. For example, this can be done in a centering manner and/or in a positive guiding manner, so that the charging plug is then aligned within the tool in a desired manner and thus centered. Examples of the centering device are explained in more detail below.

The arrangement may determine a spatial position of the charging interface, for example via a camera sensor mentioned above in some embodiments. Subsequently, the arrangement may position the tool and thus the charging plug centered therein in a predetermined manner relative to the charging interface. In result, the charging plug may take a predetermined relative position with regard to the charging interface (that is, a predetermined relative position and a predetermined relative orientation).

For example, the relative position may be characterized in that only one movement around and/or along a single spatial axis is required to connect the charging plug and the charging interface. The single spatial axis may be a spatial axis around or along which the charging plug may be moved by means of the tool movement axis. For example, this may be a linear spatial axis along which the charging plug must be moved for connection. The spatial axis can extend orthogonally to the charging interface.

To connect to the charging interface, the tool movement axis may subsequently shift and/or translationally displace the charging plug and thus for example completely insert the charging plug into the charging interface while establishing an electrical contact.

Reaching the relative position for example may comprises bringing the charging plug into contact with a guide section of the charging interface. The guide section may be a mechanical and/or generally stable section of the charging interface (for example a protrusion). For example, the guide section may be the peripheral area of a so-called charging socket and/or socket, which peripheral area defines an area which generally surrounds the electrical contact sections of the charging interface and has an annular form. The guide section may center the charging plug relative to a spatial axis and/or at least surround a section of the charging plug on several sides or completely. As a result, the charging plug may be immovable relative to the spatial axis (i.e., centered relative to the spatial axis or held in position relative to the spatial axis). However, the charging plug may be displaceable along this spatial axis, for example, under the guidance of the guide section.

These embodiments ensure that a guidance and/or centering function is transferred from the centering device to the guide section of the charging interface. Subsequently, the tool movement axis may move the charging plug relative to the charging interface in a guided manner (e.g., in a linearly guided manner), and, e.g., slide the charging plug into the charging interface, wherein however the interaction with the centering device may be suspended (for example by releasing a mechanical engagement between the charging plug and centering device). This provides that at least during displacements the charging plug is largely guided by only one single element (for example by means of the guide section or by means of the centering section) and that therefore multiple forced guiding of the charging plug is essentially avoided. The latter would, in order to compensate for tolerances, possibly require more complex support of the charging plug within the tool and/or more precise measuring methods during positioning or moving the charging plug.

In general and according to some embodiments, the tool may hold the charging plug only temporarily. For example, the charging plug may be temporarily connected to a holding section of the tool mentioned above and then moved in space by means of the tool. For example, after connecting to the charging interface, the charging plug may be detached from the tool. For this purpose, for example, a seat of the charging plug in the tool and/or in a holding section thereof may be resolved.

In some embodiments, the centering device is arranged to establish a positive fit with the charging plug. For this purpose, the centering device may comprise at least one receiving section. A correspondingly shaped counterpart of the charging plug may be accommodated in the receiving section, for example while providing the centering effect or by means of a positive guide of the charging plug by means of the centering device. For example, the centering device may comprise a recess as receiving section, which receives a projection of the charging plug in a centering manner. In addition to the positive fit, a frictional connection may also be established in order to maintain the centering effect even in the case of shaking or under dynamic movement forces. This frictional connection may, however, be dimensioned such that it can be canceled again by means of the tool movement axis. The frictional connection may be produced, for example, by elastically widening a receiving section of the centering device through a section of the charging plug received therein.

In general, the receiving section may be at least partially elastic and may be elastically deformable by receiving the charging plug. This also enables the provision of a positive fit and/or a frictional fit of the type explained above.

As mentioned, the tool movement axis may be a linear axis in some embodiments. Additionally or alternatively and in some embodiments, the tool movement axis may be configured to move the charging plug relative to the e.g., stationary, centering device. In this context, the tool movement axis may be configured to connect the charging plug to the centering device (for example by engagement therewith) when the charging plug is moved in a first direction (which is for example directed away from the charging interface). When moving in a second direction, which may be opposite to the first direction and which may be, for example, in the direction of the charging interface, the tool movement axis may detach the charging plug from the centering device.

This may be done by releasing a contact and/or an engagement between the charging plug and the centering device, for example because the plug is, so to speak, detached from or lifted off the, e.g., stationary centering device.

Another exemplary aspect relates to a tool for connecting a charging plug to a charging interface of a vehicle, wherein the tool in principle may be designed in accordance with any aspect/embodiment and for example in accordance with any aspect/embodiment described in connection with the arrangement. For example, the tool may be configured to hold the charging plug. Furthermore, the tool may comprise a centering device for centering the charging plug within the tool and a controllable tool movement axis for moving the charging plug, the tool also being configured to connect the charging plug to the charging interface by means of the tool movement axis.

Of course all features, developments, functions and interactions described herein may be provided accordingly in connection with the tool, also independently of further details of the arrangement and/or the method. With other words, all of the features of the tool and functions of the tool described herein may be included in the accompanying independent tool claim.

Another exemplary aspect relates to a method for connecting a charging plug to a charging interface of a vehicle, the method comprising:
  providing a movement apparatus with several controllable movement axes;
  providing a tool that can be positioned by means of the moving apparatus relative to the vehicle and is configured to hold the charging plug, the tool having a centering device for centering the charging plug within the tool and a controllable tool movement axis for moving the charging plug independently of the movement axes of the movement apparatus;
  positioning the tool with the charging plug centered therein by means of the moving apparatus in a predetermined relative position with regard to the charging interface; and subsequently
  connect the charging plug to the charging interface using the tool movement axis.

The method may be carried out by an arrangement of any kind described herein. In general, the method may comprise one, some, or all further features, steps, variants, and developments according to the described aspects and embodiments, in order to achieve one, some, or all of the functions, operating states, interactions and effects described herein. For example, all explanations for the features of the arrangement and/or the tool may, e.g., also be provided or apply to the same process features.

For example, the method may comprise a further step of detaching the tool from the charging plug after connecting to the charging interface and/or bringing the charging plug into contact with a guide section of the charging interface when the relative position is reached.

Reference will now be made to the drawings in which the various elements of embodiments will be given numerical designations and in which further embodiments will be discussed.

In the exemplary embodiments, the described components of the embodiments each represent individual features that are to be considered independent of one another, in the combination as shown or described, and in combinations other than shown or described. In addition, the described embodiments can also be supplemented by features of the invention other than those described.

Specific references to components, process steps, and other elements are not intended to be limiting. Further, it is understood that like parts bear the same or similar reference numerals when referring to alternate FIG. 1t is further noted that the FIGS. are schematic and provided for guidance to the skilled reader and are not necessarily drawn to scale. Rather, the various drawing scales, aspect ratios, and numbers of components shown in the FIGS. may be purposely distorted to make certain features or relationships easier to understand.

Figure 2:
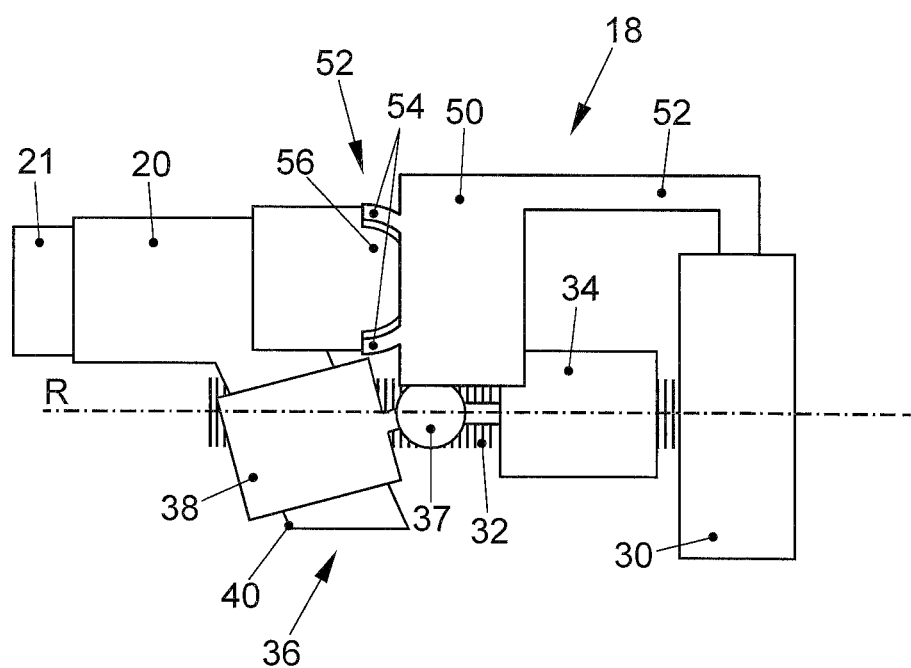
FIG. 2 shows a tool of the arrangement of FIG. 1 in a detailed view and in a first operating state, in which the tool and in particular a charging plug held by the tool is positioned by means of a robot of the arrangement.
Figure 3:
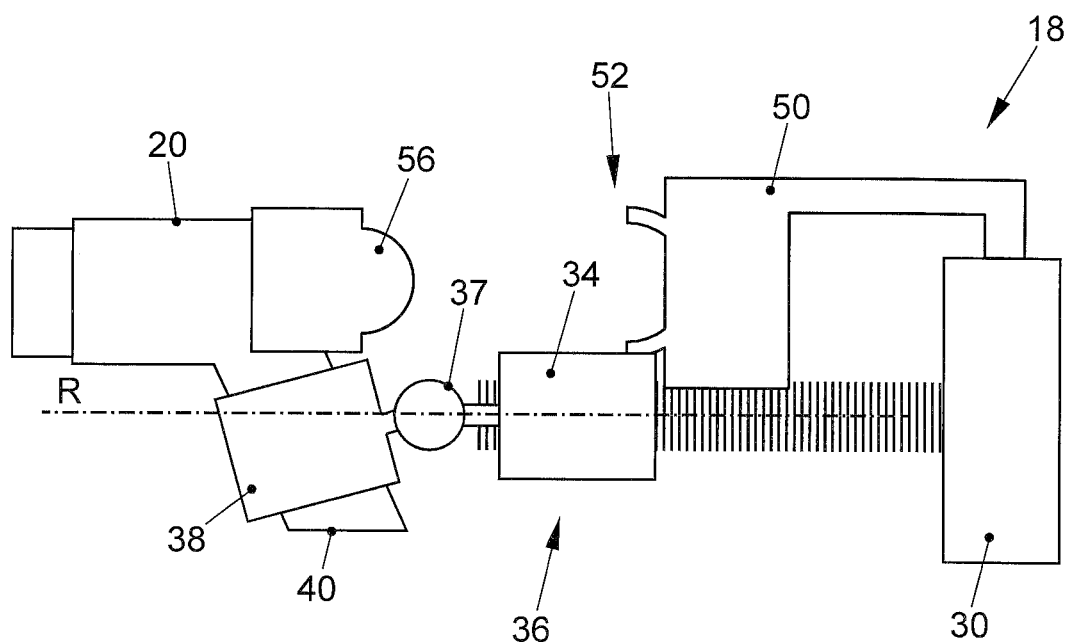
FIG. 3 shows the tool in a representation analogous to FIG. 1 but in a second operating state in which the charging plug has been moved by means of a movement axis of the tool.

A highly simplified illustration of an arrangement 10 is shown in FIG. 1. The arrangement comprises a moving apparatus (industrial robot 12), which is designed in a manner known per se as an articulated robot. The industrial robot 12 accordingly comprises a plurality of movement axes 14, only two of which are shown by way of example and which are designed as rotational axes. Thereby a tool interface 16 can be positioned in space in a manner known per se. A tool 18 explained below with reference to FIGS. 2 and 3 is arranged on the tool interface 16. The tool 18 holds a charging plug 20, which is connected to an energy supply 22, for example via a cable 24 indicated by a broken line.

The industrial robot 12 is in principle configured to move the tool 18 together with the charging plug 20 held therein, in particular relative to a schematically indicated vehicle 26.

The vehicle 26 includes a charging interface 28 in the form of a socket. The charging plug 20 can be plugged into the charging interface 28 thereby establishing an electrical contact in order to electrically transmit energy from the energy supply 22 into an energy storage device (not shown) of the vehicle 26. This insertion is usually carried out manually, but in the present case is to be carried out by the industrial robot 12.

In FIG. 2, the tool 18 is shown in a detailed representation. The tool 18 comprises a base element 30, in which a spindle 32 is rotatably mounted. It is not shown that the base part 30 also includes a servo motor for rotating the spindle 32. An axis of rotation R of the spindle 32 is indicated by dashed lines in FIG. 2.

A spindle nut 34 is arranged on the spindle 32. The spindle nut 34 can be displaced linearly along the axis of rotation R in a manner known per se by rotating the spindle 32. The spindle nut-spindle combination 32, 34 thus forms a linear tool movement axis 36.

The spindle nut 34 is connected to a holding section 38 via a joint 36 (for example a solid-body joint). As explained further below, the holding section 38 is resiliently mounted via the joint 37 within the tool 18, in the case shown on the spindle nut 34 and thus on the linear movement axis 36.

The holding section 38 comprises a cylindrical recess (not shown), wherein a longitudinal cylinder axis extends in the drawing plane and oblique to the axis of rotation R. In this recess, which is not shown, a handle portion 40 of the charging connector 20 is inserted. For this, the robot can push the holding section 38 onto the handle section 40, for example in order to lift or lift off the charging plug 20 from the energy supply 22 or from another defined starting position.

In order to avoid collisions with the spindle 32, the holding section 38 in FIG. 2 can be positioned closer to the viewer than the spindle 32 (the joint 37 would then extend obliquely forward from the spindle nut 34 in the direction of the viewer).

In principle, it can thus be seen that by linearly displacing the spindle nut 34, the holding section 38 and thus the charging plug 20 can also be displaced linearly.

A centering device 50 of the tool 18 is also shown in FIG. 2. The centering device 50 is firmly positioned within the tool 18, as indicated by a connecting arm 52 to the base part 30. The centering device 50 is generally configured to center the charging plug 20 according to a predetermined relative position and orientation within the tool 18. For this purpose, the centering device 50 in the example shown comprises a receiving section 52. This is formed with two projecting elastic arms 54 which define a corresponding receiving area of the centering device 50 between them. It is also possible to provide a circumferential annular section, that is to say the arms 54 could also correspond to a cross-sectional representation through a corresponding circumferential ring section.

A correspondingly shaped counterpart 56 of the charging plug 20 is received in the receiving section 52 delimited by the arms 54. This may be done, although not clearly shown in FIG. 2, in particular by forming a positive fit. In addition, a frictional connection may also be formed, for example by elastically expanding the arms 54.

When the counterpart 56 and the centering device 50 are arranged or brought into engagement, the charging plug 20 thus in particular may be centered around and along all spatial axes, but at least relatively and above all transversely to the axis of rotation R. The provision of the joint 36 is beneficial, which serves for tolerance compensation in this process.

Bringing into engagement can be carried out by means of the tool movement axis 36, for example by moving the charging plug 20 from the position shown in FIG. 3 to the position shown in FIG. 2. For the sake of completeness, it should be noted that the position shown in FIG. 3 can also correspond to a position in which the charging plug 20 was first gripped or received by the holding section 38.

After the state shown in FIG. 2 has been reached, the industrial robot 12 can position the tool 30 and, due to the centering, also the charging plug 20 in a predetermined relative position relative to the charging interface 28.

It is not shown that the arrangement 10 can also include a sensor therefor, in order to at least roughly detect the position of the charging interface 28. Such a sensor can be, for example, a camera sensor, which can be attached to the robot 12 or can also be positioned in a stationary manner in a working space of the arrangement 10.

In the example shown, the desired relative position of the charging plug 20 with regard to the charging interface 28 is achieved when a foremost insertion section 21 of the charging plug 20 (see FIG. 2) is received in a receiving ring section of the charging interface 28. This ring section can be a conventional peripheral section in the form of a socket. It may be the case that the receiving section of the charging interface 28 centers the charging plug 20 or its position at least with respect to the axis of rotation R.

For example, this section can be a guide section 29, which is indicated in FIG. 1 and protrudes from the plane of the page. This section may suppress movements of the charging plug 20 in the direction transverse to the axis of rotation R, but enable movements along the axis of rotation R. Consequently, it can be a linear guide section 29 which defines or maintains linear movements of the charging plug 20 along the axis of rotation R and thus also along a displacement axis of the tool movement axis 36.

After insertion into the guide section 29 by means of the industrial robot 12, any further displacement of the charging plug 20 along the axis of rotation R, at least one shift further in the direction of the charging interface 28, can thus be forcibly guided by the guide section 29.

Subsequently, the movement axes 14 of the industrial robot 12 can stand still or be blocked. Further movements of the charging plug 20 to establish a complete connection with the charging interface 28 then in particular may be carried out exclusively by means of the movement axis 36. More specifically, the spindle 32 is then driven in rotation and the spindle nut 34 is shifted to the left in FIG. 2. The state shown in FIG. 3 is thereby achieved.

It can be seen that the counterpart 56 has been lifted off the centering device 50 and thus the engagement in the centering section 52 is terminated. The guide effect is then taken over by the linear guide section 29 of the charging interface 28 in the manner described above. In contrast, the charging plug 20 is no longer centered within the tool 18, but is deliberately resiliently mounted via the joint 37. In this way, tolerances can be compensated and increased counterforces arising during a linear displacement of the charging plug 20 can be at least partially compensated for.

In the state shown in FIG. 3, the charging plug 20 has already been completely inserted into the charging interface 28 or its guide section 29, which is not shown separately there. The maximum insertion depth into the charging interface 28 has been reached and the connection of the charging plug 20 and charging interface 28 has been completed (that is, the desired electrical contact between them has been completely established). The tool 18 can be released from the charging plug 20 by moving the robot 12, for example by stripping off the holding section 38 from the handle section 40 of the charging plug 20. A positioning of the cable 24 on the charging plug 20 should be chosen accordingly so that this does not constitute an obstacle (for example, by placing it on an upper side of the charging plug 20).

The tool 18 can then be used to receive a charging plug 20 from another energy supply device 22 and to connect it to a charging interface 28 of another vehicle 26.

Figure 4:
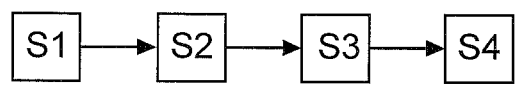
FIG. 4 shows a flow diagram of a method that can be carried out with the arrangement from FIG. 1.

FIG. 4 shows a flow diagram of a method according to some embodiments. In a step S1, the charging plug 20 is gripped or raised by the tool 18. Thereby, the tool for example assumes a state analogous to that from FIG. 3. In a step S2, the charging plug 20 is centered within the tool 18. For this purpose, the charging plug 20 is shifted from the state of FIG. 3 to the state of FIG. 2 by means of the tool movement axis 36.

In a step S3, which in principle can also be carried out before the previously mentioned steps and/or at least partially in parallel, a position of the charging interface 28 of the vehicle 26 is at least roughly recorded. The industrial robot 12 then arranges the centered charging plug 20 by positioning the tool 18 according to a prescribed relative position with regard to the charging interface 28. For this purpose, the industrial robot 12 at least partially pushes the front section 21 of the charging plug 20 into the guide sections 29 of the charging interface 28 in the manner described above. In a step S4, the tool movement axis 36 is then activated and shifts the charging plug 20 from the state shown in FIG. 2 to the state shown in FIG. 3. As a result, the charging plug 20 is pushed completely into the charging interface 28, the movement being guided linearly through the guide section 29 and for example the tolerance compensation being provided via the joint 37.

LIST OF REFERENCE NUMERALS

10 arrangement
12 industrial robot
14 movement axis 16 tool interface
18 tool
20 charging plug
22 energy supply device
24 cable
26 vehicle
28 charging interface
29 guide section
21 contact section
30 base part
32 spindle
34 spindle nut
36 tool movement axis
37 joint
38 holding section
40 handle section
50 centering device
52 receiving section
54 arms
56 counterpart The invention has been described in the preceding using various exemplary embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor, module or other unit or device may fulfil the functions of several items recited in the claims.

The mere fact that certain measures are recited in mutually different dependent claims or embodiments does not indicate that a combination of these measures cannot be used to advantage. Any reference signs in the claims should not be construed as limiting the scope.

What is claimed is:

1. An arrangement for connecting a charging plug to a charging interface of a vehicle, with:
    a moving apparatus with a plurality of controllable movement axes;
    a tool which can be positioned using the moving apparatus relative to the vehicle and is configured to releasably hold the charging plug, the tool having a centering device for centering the charging plug within the tool and a controllable tool movement axis for moving the charging plug independently of the movement axes of the moving apparatus;
    wherein the tool with the charging plug centered therein can be positioned in a predetermined relative position with regard to the charging interface using the moving apparatus and wherein the charging plug subsequently can be connected with the charging interface using the tool movement axis; and wherein
    after connection of the charging plug with the charging interface, the charging plug is releasable from the tool.

2. The arrangement of claim 1, wherein arriving at the relative position comprises bringing the charging plug into contact with a guide section of the charging interface.

3. The arrangement of claim 2, wherein the centering device is configured to establish a positive connection with the charging plug.

4. The arrangement of claim 2, wherein the tool comprises a holding section for the charging plug, which is resiliently mounted on the tool movement axis.

5. The arrangement of claim 2, wherein the tool movement axis is a linear axis.

6. The arrangement of claim 1, wherein the centering device is configured to establish a positive connection with the charging plug.

7. The arrangement of claim 6, wherein the tool comprises a holding section for the charging plug, which is resiliently mounted on the tool movement axis.

8. The arrangement of claim 6, wherein the tool movement axis is a linear axis.

9. The arrangement of claim 1, wherein the tool comprises a holding section for the charging plug, which is resiliently mounted on the tool movement axis.

10. The arrangement of claim 9, wherein the tool movement axis is a linear axis.

11. The arrangement of claim 1, wherein the tool movement axis is a linear axis.

12. The arrangement of claim 1, wherein the tool movement axis is configured to move the charging plug relative to the centering device.

13. The arrangement of claim 12, wherein the tool movement axis is configured to connect the charging plug to the centering device by moving it in a first direction and to disconnect the charging plug from the centering device by moving it in a second direction.

14. A tool for connecting a charging plug to a charging interface of a vehicle,
    wherein the tool is configured to releasably hold the charging plug and comprises a centering device for centering the charging plug within the tool and a controllable tool movement axis for moving the charging plug;
    wherein the tool is configured to connect the charging plug to the charging interface using the tool movement axis; and wherein
    after connection of the charging plug with the charging interface, the charging plug is releasable from the tool.

15. A method for connecting a charging plug to a charging interface of a vehicle using a moving apparatus with a plurality of controllable movement axes and a tool which can be positioned using the moving apparatus relative to the vehicle, which tool is configured to releasably hold the charging plug, wherein the tool comprises a centering device for centering the charging plug within the tool and a controllable tool movement axis for moving the charging plug independently of the movement axes of the moving apparatus; the method comprising:
    positioning the tool with the charging plug centered therein using the moving apparatus in a predetermined relative position with regard to the charging interface;
    connecting the charging plug to the charging interface using the tool movement axis; and
    after connecting the charging plug with the charging interface, releasing the charging plug from the tool.

* * * * *